(12) United States Patent
Hirahara (10) Patent No.: US 7,555,865 B2
(45) Date of Patent: *Jul. 7, 2009

(54) METHOD AND SYSTEM OF MANUFACTURING ARTIFICIAL SEED COATS

(75) Inventor: Edwin Hirahara, Federal Way, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/982,253

(22) Filed: Nov. 4, 2004

(65) Prior Publication Data

US 2005/0108937 A1 May 26, 2005

Related U.S. Application Data

(60) Provisional application No. 60/525,433, filed on Nov. 25, 2003.

(51) Int. Cl.
*A01C 1/00* (2006.01)
(52) U.S. Cl. ............................ 47/57.6
(58) Field of Classification Search .............. 47/57.6, 47/58.1 SE, DIG. 9, DIG. 11; 504/100
See application file for complete search history.

(56) References Cited

U.S. PATENT DOCUMENTS

| | | | |
|---|---|---|---|
| 2,309,702 A | 2/1943 | Kirschenbaum | |
| 2,502,809 A | 4/1950 | Vogelsang | |
| 2,809,772 A | 10/1957 | Weisz | |
| 3,034,905 A | 5/1962 | Weintraub et al. | |
| 3,098,320 A | 7/1963 | Estkowski | |
| 3,545,129 A | 12/1970 | Schreiber et al. | |
| 3,688,437 A | 9/1972 | Hamrin | |
| 3,690,034 A | 9/1972 | Knapp | |
| 3,734,987 A | 5/1973 | Hamrin | |
| 3,850,753 A | 11/1974 | Chibata et al. | |
| 4,147,930 A | 4/1979 | Browne et al. | |
| 4,166,006 A | 8/1979 | Hertl et al. | |
| 4,252,827 A | 2/1981 | Yokoyama et al. | |
| 4,465,017 A | 8/1984 | Simmons | |

(Continued)

FOREIGN PATENT DOCUMENTS

CA        1241552        9/1988

(Continued)

OTHER PUBLICATIONS

Wikipedia definition of "Assembly line" [retrieved Apr. 10 1008] 6 pages.*

(Continued)

*Primary Examiner*—David J Parsley
(74) *Attorney, Agent, or Firm*—Christensen O'Connor Johnson Kindness LLC (57) ABSTRACT

A method of manufacturing an artificial seed blank (20) is provided. The method includes placing a seed shell (22) on one of a plurality of receptacle (72) containing an end seal formation material (218) at the first assembly station. The method also includes forming an end seal (200) at one end of the seed shell by permitting the predetermined amount of an end seal formation material to change state. Further, the method includes depositing media (26) into the seed shell and positioning the seed shell at a second assembly station. The method also includes removing the seed shell from the receptacle at the second assembly station.

9 Claims, 7 Drawing Sheets

U.S. PATENT DOCUMENTS

| | | | |
|---|---|---|---|
| 4,562,663 A | 1/1986 | Redenbaugh | |
| 4,583,320 A | 4/1986 | Redenbaugh | |
| 4,615,141 A | 10/1986 | Janick et al. | |
| 4,628,633 A | 12/1986 | Nilsson | |
| 4,665,648 A | 5/1987 | Branco et al. | |
| 4,715,143 A | 12/1987 | Redenbaugh et al. | |
| 4,769,945 A | 9/1988 | Motoyama et al. | |
| 4,777,762 A | 10/1988 | Redenbaugh et al. | |
| 4,777,907 A | 10/1988 | Sänger | |
| 4,779,376 A | 10/1988 | Redenbaugh | |
| 4,780,987 A | 11/1988 | Nelson et al. | |
| 4,802,305 A | 2/1989 | Kojimoto et al. | |
| 4,802,905 A | 2/1989 | Spector | |
| 4,806,357 A | 2/1989 | Garrett et al. | |
| 4,808,430 A | 2/1989 | Kouno | |
| 4,866,096 A | 9/1989 | Schweighardt | |
| 4,879,839 A | 11/1989 | Gago et al. | |
| 5,010,685 A | 4/1991 | Sakamoto et al. | |
| 5,044,116 A | 9/1991 | Gago et al. | |
| 5,181,259 A | 1/1993 | Rorvig | |
| 5,183,757 A | 2/1993 | Roberts | |
| 5,236,469 A | 8/1993 | Carlson et al. | |
| 5,250,082 A | 10/1993 | Teng et al. | |
| 5,258,132 A | 11/1993 | Kamel et al. | |
| 5,284,765 A * | 2/1994 | Bryan et al. | 435/420 |
| 5,427,593 A | 6/1995 | Carlson et al. | |
| 5,451,241 A | 9/1995 | Carlson et al. | |
| 5,464,769 A | 11/1995 | Attree et al. | |
| 5,529,597 A | 6/1996 | Iijima | |
| 5,564,224 A | 10/1996 | Carlson et al. | |
| 5,565,355 A | 10/1996 | Smith | |
| 5,666,762 A * | 9/1997 | Carlson et al. | 47/57.6 |
| 5,680,320 A | 10/1997 | Helmer et al. | |
| 5,687,504 A | 11/1997 | Carlson et al. | |
| 5,701,699 A * | 12/1997 | Carlson et al. | 47/57.6 |
| 5,732,505 A | 3/1998 | Carlson et al. | |
| 5,771,632 A * | 6/1998 | Liu et al. | 800/295 |
| 5,784,162 A | 7/1998 | Cabib et al. | |
| 5,799,439 A | 9/1998 | MacGregor | |
| 5,821,126 A | 10/1998 | Durzan et al. | |
| 5,842,150 A | 11/1998 | Renberg et al. | |
| 5,877,850 A | 3/1999 | Ogata | |
| 5,930,803 A | 7/1999 | Becker et al. | |
| 5,960,435 A | 9/1999 | Rathmann et al. | |
| 6,021,220 A | 2/2000 | Anderholm | |
| 6,092,059 A | 7/2000 | Straforini et al. | |
| 6,119,395 A | 9/2000 | Hartle et al. | |
| 6,145,247 A | 11/2000 | McKinnis | |
| 6,470,623 B1 * | 10/2002 | Hirahara | 47/57.6 |
| 6,567,538 B1 | 5/2003 | Pelletier | |
| 6,582,159 B2 | 6/2003 | McKinnis | |
| 2002/0055615 A1 | 5/2002 | Cuttitta et al. | |
| 2002/0192686 A1 | 12/2002 | Adorjan et al. | |
| 2004/0266889 A1 * | 12/2004 | Hirahara | 514/756 |
| 2005/0108929 A1 * | 5/2005 | Hirahara | 47/1.01 R |
| 2006/0032121 A1 * | 2/2006 | Hirahara | 47/57.6 |

FOREIGN PATENT DOCUMENTS

| | | |
|---|---|---|
| CA | 1250296 | 2/1989 |
| EP | 0 107 141 A1 | 5/1984 |
| EP | 0 300 730 A1 | 1/1989 |
| EP | 0 380 692 A1 | 8/1990 |
| EP | 0776601 A1 | 6/1997 |
| EP | 1535503 A1 * | 11/2004 |
| FR | 2 680 951 A1 | 3/1993 |
| JP | 61040708 | 2/1986 |
| JP | 62275604 | 11/1987 |
| JP | 63133904 | 6/1988 |
| JP | 63152905 | 6/1988 |
| JP | 2-46240 | 2/1990 |
| JP | 407179683 A | 7/1995 |
| WO | WO 91/00781 A1 | 1/1991 |
| WO | WO 91/01803 | 2/1991 |
| WO | WO 92/07457 A1 | 5/1992 |
| WO | WO 95/05064 | 2/1995 |
| WO | WO 98/33375 | 8/1998 |
| WO | WO 99/26470 | 6/1999 |

OTHER PUBLICATIONS

Adlercreutz, P., and B. Mattiasson, "Oxygen Supply to Immobilized Biocatalysts. A Model Study," *Acta Chem. Scand. B* 36:651-653, 1982.

Adlercreutz, P., and B. Mattiasson, "Oxygen Supply to Immobilized Cells: 1. Oxgen Production by Immobilized *Chlorella pyrenoidosa*," *Enzyme Microbial Technol*. 4:332-336, 1982.

Adlercreutz, P., and B. Mattiasson, "Oxygen Supply to Immobilized Cells. 3. Oxygen Supply by Hemoglobin or Emulsions of Perfluorochemicals," *Eur. J. Appl. Microbiol. & Biotechnol*. 16:165-170, 1982.

Bapat, V.A., "Studies on Synthetic Seeds of Sandalwood (*Santalum album L*.) and Mulberry (*Morus indica L*.)," in K. Redenbaugh (ed.), *Synseeds: Applications of Synthetic Seeds to Crop Improvement*, CRC Press, Inc., Boca Raton, Fla., 1993, pp. 381-407.

Bapat, V.A., and P.S. Rao, "In Vivo Growth of Encapsulated Axillary Buds of Mulberry (*Morus indica L*.)," *Plant Cell, Tissue and Organ Culture* 20:69-70, 1990.

Bapat, V.A., and P.S. Rao, "Sandalwood Plantlets from 'Synthetic Seeds,'" *Plant Cell Reports* 7:434-436, 1988.

Buchenauer, H., "Mode of Action and Selectivity of Fungicides Which Interfere with Ergosterol Biosynthesis," *Proceedings of the 1977 British Crop Protection Conference—Pests and Diseases*, Brighton, U.K., 1977, pp. 699-711.

Chandler, D., et al., "Effects of Emulsified Perfluorochemicals on Growth and Ultrastructure of Microbial Cells in Culture," *Biotechnol. Letters* 9(3):195-200, 1987.

Cheng, Z., and P.P. Ling, "Machine Vision Techniques for Somatic Coffee Embryo Morphological Feature Extraction," *American Society of Agricultural Engineers* 37(5):1663-1669, 1994.

Chi, C.-M., et al., "An Advanced Image Analysis System for Evaluation of Somatic Embryo Development," *Biotechnology and Bioengineering* 50:65-72, Apr. 996.

Clark, Jr., L.C., et al., "Emulsions of Perfluoronated Solvents for Intravascular Gas Transport," *Fed. Proceed*. 34(6):1468-1477, 1975.

Clark, Jr., L.C., et al., "The Physiology of Synthetic Blood," *J.Thorac. & Cardiovasc. Surg*. 60(6):757-773, 1970.

Damiano, D., and S.S. Wang, "Novel Use of Perfluorocarbon for Supplying Oxygen to Aerobic Submerged Cultures," *Biotechnol. Letters* 7(2):81-86, 1985.

Datta, S.K., and I. Potrykus, "Artifical Seeds in Barley: Encapsulation of Microspore-Derived Embryos," *Thero. Appl. Genet*. 77:820-824, 1989.

Dumet, D., et al., "Cryopreservation of Oil Palm (*Elaeis guincesis Jacq*.) Somatic Embryos Involving a Desiccation Step," *Plant Cell Reports* 12:352-355, 1993.

Dupuis, J.-M., et al., "Pharmaceutical Capsules as a Coating System for Artificial Seeds," *Bio/Technol*. 12:385-389, 1994.

Ebert, W.W., and P.F. Knowles, "Inheritance of Pericarp Types, Sterility, and Dwarfness in Several Safflower Crosses," *Crop Science* 6:579-582, 1966.

Fujii, A., et al., "Artificial Seeds for Plant Propagation," *Trends in Bio/Technol*. 5:335-339, 1987.

Fujii, J., et al., "ABA Maturation and Starch Accumulation in Alfalfa Somatic Embryos" (Abstract), In Vitro 25 (3, Part 2):61A, 1989.

Fujii, J., et al., "Improving Plantlet Growth and Vigor From Alfalfa Artificial Seed" (Abstract), In Vitro 24 (3, Part 2):70A, 1989.

Fujita, T., et al., "Fluorocarbon Emulsion as a Candidate for Artificial Blood," *Europ. Surg. Res*. 3:436-453, 1971.

Geyer, R.P., "'Bloodless' Rats Through the Use of Artificial Blood Substitutes," *Fed. Proceed* 34(6):1499-1505, 1975.

Gray, D.J., and A. Purohit, "Somatic Embryogenesis and Development of Synthetic Seed Technology," *Crit. Rev. Plant Sci*. 10(1):33-61, 1991.

Gupta, P.K., and D.J. Durzan, "Biotechnology of Somatic Polyembryogenesis and Plantlet Regeneration in Loblolly Pine," *Bio/Technol.* 5:147-151, 1987.

Ibarbia, E.A., "Synthetic Seed: Is It the Future," *Western Grower and Shipper* 59:12, 1988.

Janick, J., "Production of Synthetic Seed via Desiccation and Encapsulation" (Abstract), In Vitro 24 (3, Part 2):70A, 1989.

Kamada, H., et al., "New Methods for Somatic Embryo Induction and Their Use of Synthetic Production" (Abstract), In Vitro 24(3, Part 2):71A, 1988.

Kim YH, "ABA and Polyox-Encapsulation or High Humidity Increases Survival of Desiccated Somatic Embryos of Celery," *HortScience* 24(4):674-676, 1989.

King, A.T., et al., "Perfluorochemicals and Cell Culture," *Biotechnol.* 7:1037-1042, 1989.

Kitto, S.L., and J. Janick, "A Citrus Embryo Assay to Screen Water-Soluble Resins as Synthetic Seed Coats," *HortScience* 20(1):98-100, 1985.

Kitto, S.L., and J. Janick, "Production of Synthetic Seeds by Encapsulating Asexual Embryos of Carrot," *J. Amer. Soc. Hort. Sci.* 110(2):277-282, 1985.

Li, X.-Q., "Somatic Embryogenesis and Synthetic Seed Technology Using Carrot as a Model System," in K. Redenbaugh (ed.), *Synseeds: Applications of Synthetic Seeds to Crop Improvement*, CRC Press, Inc., Boca Raton, Fla., 1993, pp. 289-304.

Mattiasson, B., and P. Adlercreutz, "Use of Perfluorochemicals for Oxygen Supply to Immobilized Cells," *Ann. N.Y. Acad. Sci.* 413:545-547, 1984.

Paulet, F., et al., "Cryopreservation of Apices of In Vitro Plantlets of Sugarcane (*Saccharum* sp. Hybrids) Using Encapsulation/Dehydration," *Plant Cell Reports* 12:525-529, 1993.

Redenbaugh, K., et al., "Encapsulated Plant Embryos," *Biotechnology in Agriculture*, 1988, pp. 225-248.

Redenbaugh, K., et al., "Encapsulation of Somatic Embryos for Artificial Seed Production" (Abstract), In Vitro 20(2):256-257, 1984.

Redenbaugh, K., et al., "Encapsulation of Somatic Embryos in Synthetic Seed Coats," *HortScience* 22(5):803-809, 1987.

Redenbaugh, K., et al., "III.3 Artificial Seeds—Encapsulated Somatic Embryos," *Biotech. in Agr. & For.* 17:395-416, 1991.

Redenbaugh, K., et al., "Scale-Up: Artificial Seeds," in Green et al. (eds.), *Plant Tissue and Cell Culture*, Alan R. Liss, Inc., New York, 1987, pp. 473-493.

Redenbaugh, K., et al., "Somatic Seeds: Encapsulation of Asexual Plant Embryos," *Bio/Technology* 4:797-801, 1986.

Riess, J.G., and M. Le Blanc, "Perfluoro Compounds as Blood Substitutes," *Angew. Chem. Int. Ed. Engl.* 17(9):621-634, 1978.

Rogers, M., "Synthetic-Seed Technology," *Newsweek*, Nov. 28, 1983.

Sanada, M., et al., "Celery and Lettuce," in M.K. Redenbaugh (ed.), *Synseeds: Applications of Synthetic Seeds to Crop Improvement*, CRC Press, Inc., Boca Raton, Fla., 1993, pp. 305-322.

Senaratna, T., "Artificial Seeds," *Biotech Adv.* 10(3)379-392, 1992.

Sharma SK et al., "Novel Compositions of Emulsified Perfluorocarbons for Biological Applications," *Brit. J. Pharmacol.* 89:665P, 1986.

Stuart, D.A., and M.K. Redenbaugh, "Use of Somatic Embryogenesis for the Regeneration of Plants," in H.M. LeBaron et al. (eds.), *Biotechnology in Agricultural Chemistry*, American Chemical Society, Washington, D.C., 1987, pp. 87-96.

Teasdale, R.D., and P.A. Buxton, "Culture of *Pinus radiata* Embryos With Reference to Artificial Seed Production," *New Zealand J. For. Sci.* 16(3):387-391, 1986.

Tessereau, H. et al., "Cryopreservation of Somatic Embryos: A Tool for Germplasm Storage and Commercial Delivery of Selected Plants," *Ann. Bot.* 74:547-555, 1994.

Timmis, R., "Bioprocessing for Tree Production in the Forest Industry: Conifer Somatic Embryogenesis," *Biotechnology Progress* 14(1):156-166, 1998.

Weyerhaeauser, G.H., "Biotechnology in Forestry: The Promise and the Economic Reality" *Solutions! for People, Processes and Paper* 86(10):28-30, Oct. 2003.

\* cited by examiner

METHOD AND SYSTEM OF MANUFACTURING ARTIFICIAL SEED COATS

CROSS REFERENCE TO RELATED APPLICATION

The present application claims the benefit of U.S. Provisional Application No. 60/525,433, filed Nov. 25, 2003.

FIELD OF THE INVENTION

The present invention relates generally to artificial seeds and, more particularly, to a method and system of manufacturing seed blanks for manufactured seeds.

BACKGROUND OF THE INVENTION

Asexual propagation for plants has been shown for some species to yield large numbers of genetically identical embryos, each having the capacity to develop into a normal plant. Such embryos must usually be further cultured under laboratory conditions until they reach an autotrophic "seedling" state characterized by an ability to produce their own food via photosynthesis, resist desiccation, produce roots able to penetrate soil, and fend off soil microorganisms. Some researchers have experimented with the production of artificial seeds, known as manufactured seeds, in which individual plant somatic or zygotic embryos are encapsulated in a seed coat. Examples of such manufactured seeds are disclosed in U.S. Pat. No. 5,701,699, issued to Carlson et al., the disclosure of which is hereby expressly incorporated by reference.

Typical manufactured seeds include a seed shell, synthetic gametophyte and a plant embryo. A manufactured seed that does not include the plant embryo is known in the art as a "seed blank." The seed blank typically is a cylindrical capsule having a closed end and an open end. The synthetic gametophyte is placed within the seed shell to substantially fill the interior of the seed shell. A longitudinally extending hard porous insert, commonly known as a cotyledon restraint, may be centrally located within the synthetic gametophyte and includes a centrally located cavity extending partially through the length of the cotyledon restraint. The cavity is sized to receive the plant embryo therein. The well-known plant embryo includes a radicle end and a cotyledon end. The plant embryo is deposited within the cavity of the cotyledon restraint cotyledon end first and is sealed within the seed blank by at least one end seal. There is a weakened spot in the end seal to allow the radicle end of the embryo to penetrate the end seal.

Currently, the seed shell is manufactured by hand and is formed from sectioning a tube, such as a straw, and processing the sections of the tube to enhance its abilities to withstand exposure to the environment. One such seed shell is manufactured by sectioning a straw of fibrous material, and then coating the resulting straw section with a wax. One suitable method for applying the wax coating is to dip the straw sections into a bath of wax. The straw sections are then withdrawn from the wax bath and then the wax is permitted to harden to seal the straw sections.

Although such seed blanks are effective, they are not without their problems. As a non-limiting example, because the current process of manufacturing seed blanks is manual, it is labor-intensive and, therefore, expensive. Additionally, because such existing processes are manual, manipulation and manufacture of a large number of seed blanks in accordance with existing practice can be time-intensive. As a result, mass production of manufactured seeds is not only time-consuming, but also expensive.

Thus, there exists a need for a method and system of manufacturing artificial seed blanks that can manipulate and assemble a large number of seed blanks at a relatively low cost, with a high degree of reliability, and without adversely affecting the quality of resulting seed blanks.

SUMMARY OF THE INVENTION

In a material handling system having means for automatically assembling and transporting an artificial seed blank between a plurality of assembly stations arranged in a sequential configuration, a method of manufacturing an artificial seed blank is provided. The method includes placing a seed shell on one of a plurality of receptacles containing an end seal formation material at a first assembly station. The method also includes forming an end seal at one end of the seed shell by permitting the predetermined amount of end seal formation material to change state, and depositing media into the seed shell. Further, such a method includes positioning the seed shell at a second assembly station, and removing the seed shell from the receptacle at the second assembly station.

A method of manufacturing an artificial seed blank formed in accordance with another embodiment of the present invention includes placing a restraint on one of a plurality of receptacles and dipping the restraint on one of the plurality of receptacles in a container of an end seal formation material. The method also includes placing a seed shell over the restraint on the one of the plurality of receptacles to align the restraint within the seed shell, and allowing the end seal formation material to change state and form an end seal at one end of the seed shell.

A material handling system for automatically assembling and transporting an artificial seed blank between a plurality of assembly stations arranged in a sequential configuration is also provided. The material handling system includes a transport assembly having a plurality of receptacles, each one of the plurality of receptacles is adapted to receive an artificial seed shell. A drive assembly is coupled to the transport assembly to selectively transport at least one of the plurality of receptacles between the plurality of assembly stations. The material handling system also includes means for forming an end seal in communication with the transport assembly. Further, such a material handling system includes a cooling assembly in communication with a portion of the transport assembly to accelerate a change in state of media disposed within the seed shell.

The method and system of manufacturing artificial seed blanks, as well as the resulting manufactured seed blank, formed in accordance with the various embodiments of the present invention, have several advantages over currently available methods. The method and system of the present disclosure is simpler to operate as it consolidates various parts of the assembly procedure at substantially one location. Also, because such a method and system is automated, it reduces manual labor required to manipulate and assemble seed blanks and, therefore, is cheaper than existing systems.

Thus, a method and system of manufacturing artificial seed blanks in accordance with the various embodiments of the present invention has a high degree of reliability, and is capable of mass producing artificial seed blanks at a relatively low cost.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
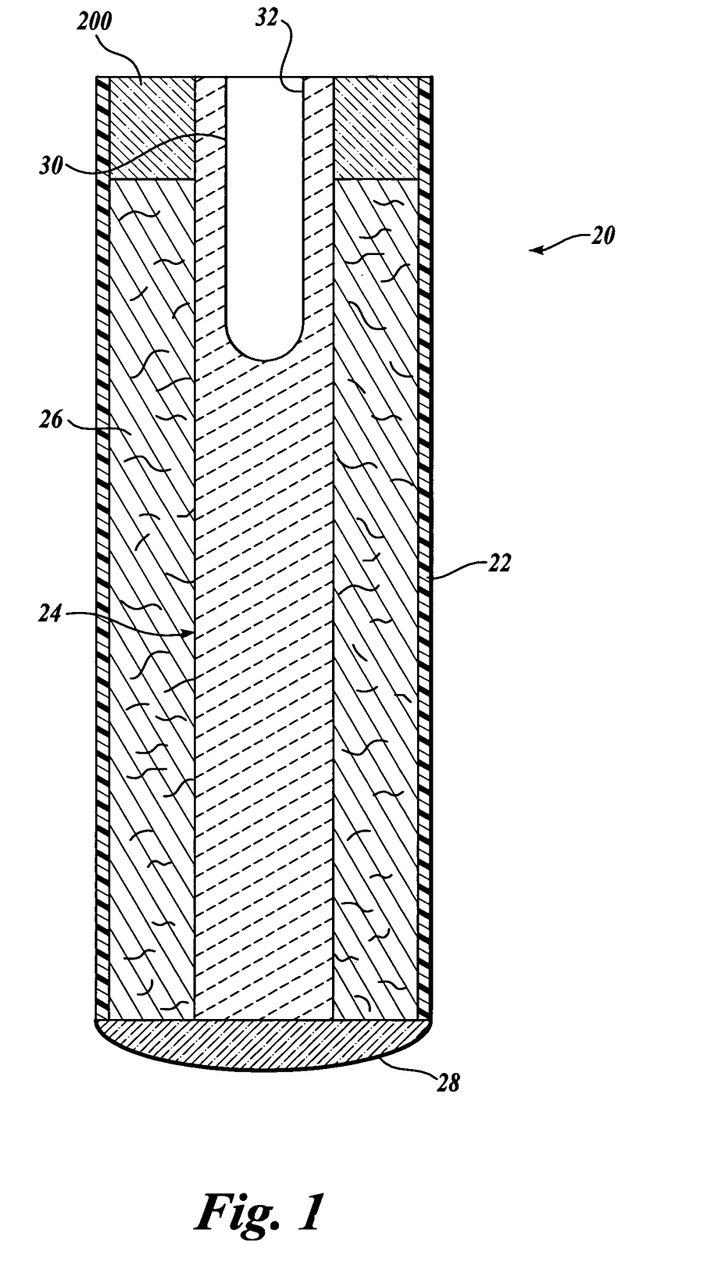
FIG. 1 is a cross-sectional side view of a manufactured seed blank formed in accordance with various embodiments of the present invention.

FIG. 1 illustrates a seed blank 20 constructed in accordance with certain embodiments of the present invention. Such a seed blank 20 is suitably used for a manufactured seed, such as is disclosed in U.S. Pat. No. 5,701,699, issued to Carlson et al., the disclosure of which is hereby expressly incorporated by reference.

The seed blank 20 includes a seed shell 22, a cotyledon restraint 24, a primary end seal 200, and an end seal 28. The end seal 28 is shown for illustrative purposes only and is not a necessary element of the present invention.

The seed shell 22 is suitably formed from a tube. In one embodiment, the tube is a straw of fibrous material, such as paper, and is sectioned in appropriate lengths. The sections of straw are pretreated in a suitable coating material, such as wax. It should be apparent that although sectioning tube is preferred, other embodiments, such as obtaining tubes of appropriate size for use as manufactured seeds, are also within the scope of the present invention.

The cotyledon restraint 24 is suitably manufactured from a hard, porous material and includes longitudinally extending cavity 30. The cavity 30 extends through the end seal 200 and partially through one end of the cotyledon restraint 24. The open end of the cavity 30 is known as a cotyledon restraint opening 32. The cavity 30 is sized to receive a plant embryo (not shown) therein. The seed blank 20 also includes synthetic gametophyte 26 disposed within the seed shell 22, as is described in greater detail below.

Figure 2:
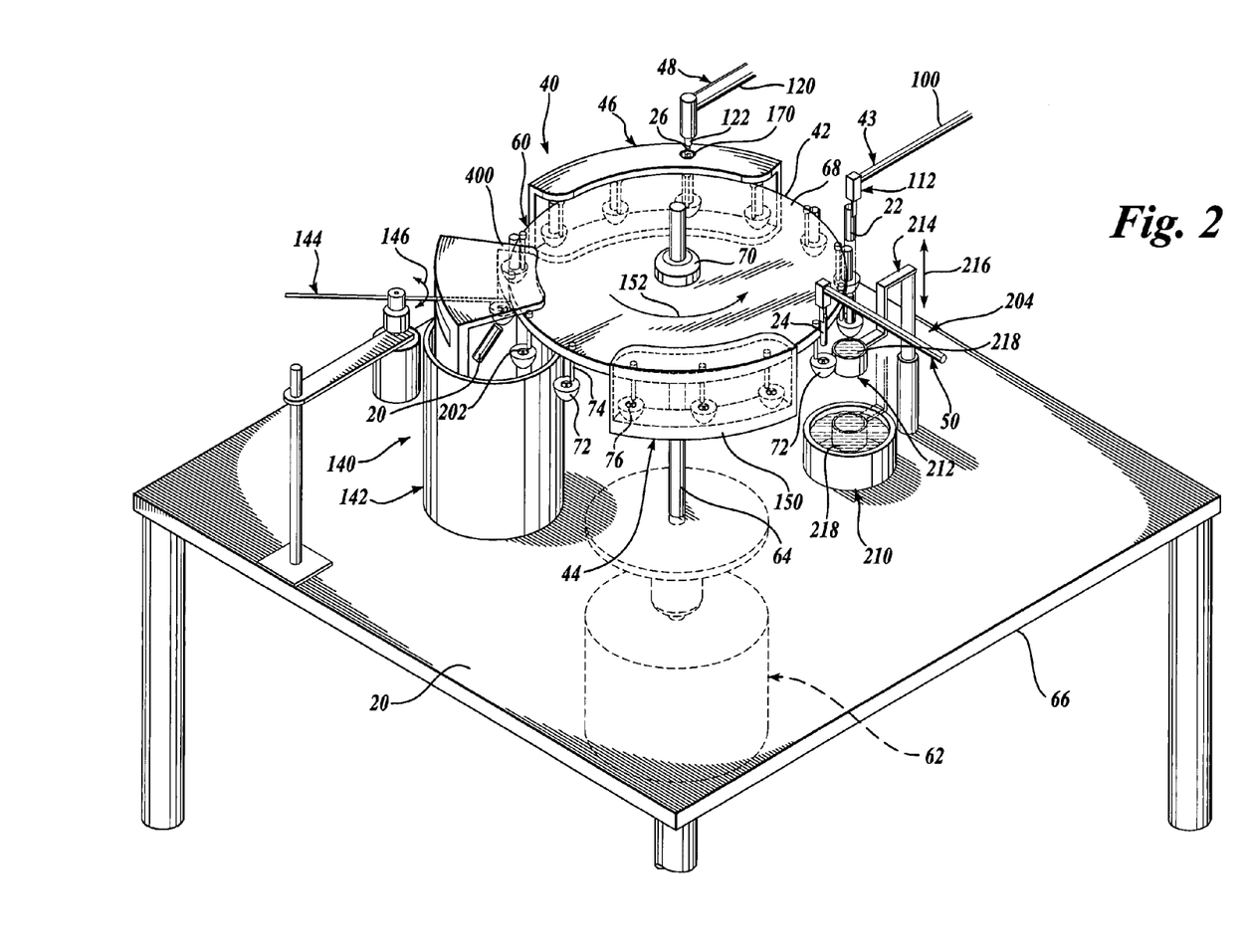
FIG. 2 is an isometric view of one embodiment of a material handling system for automatically assembling and transporting an artificial seed blanks between a plurality of assembly stations.
Figure 3:
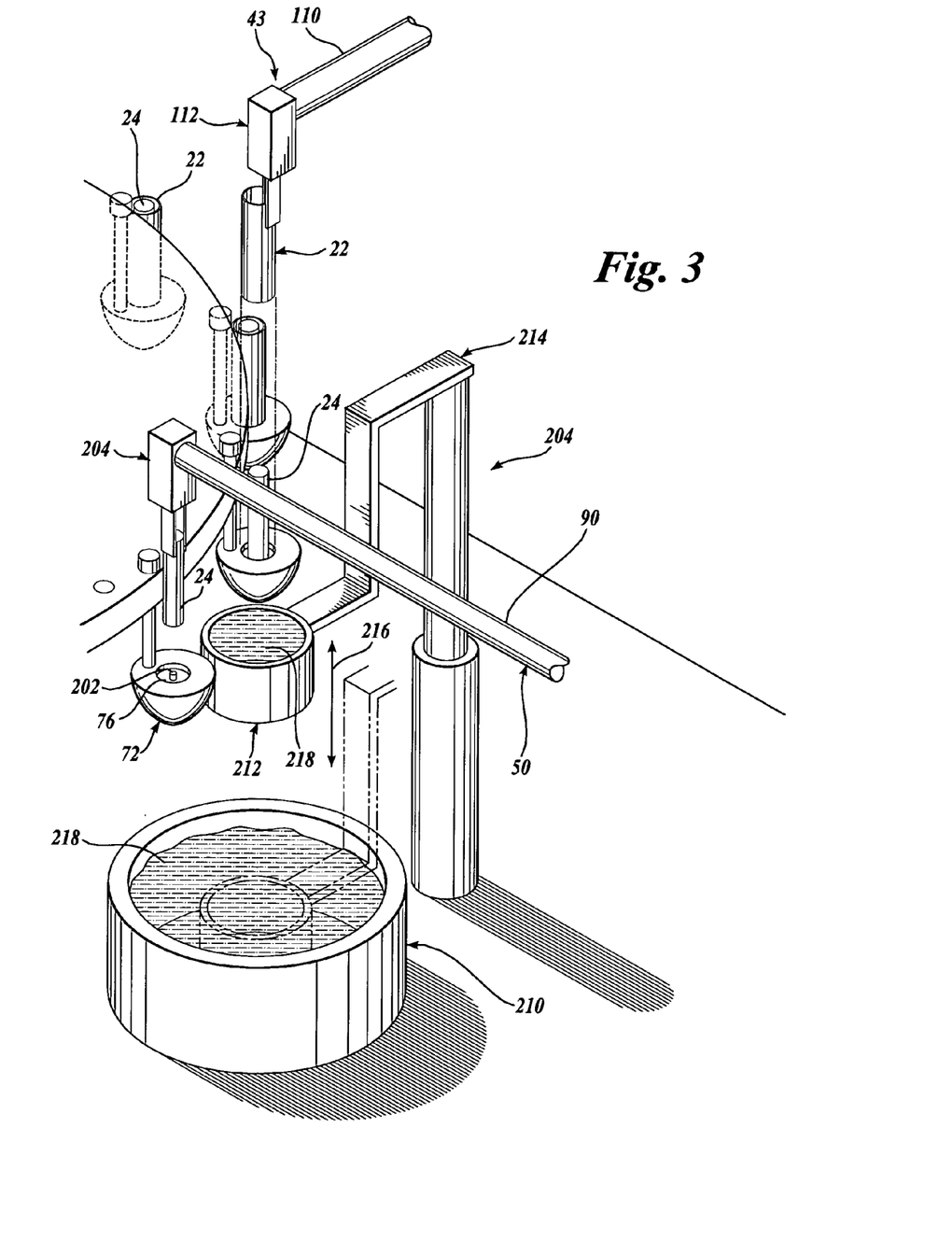
FIG. 3 is a partial isometric view of a portion of the material handling system of FIG. 2.
Figure 4:
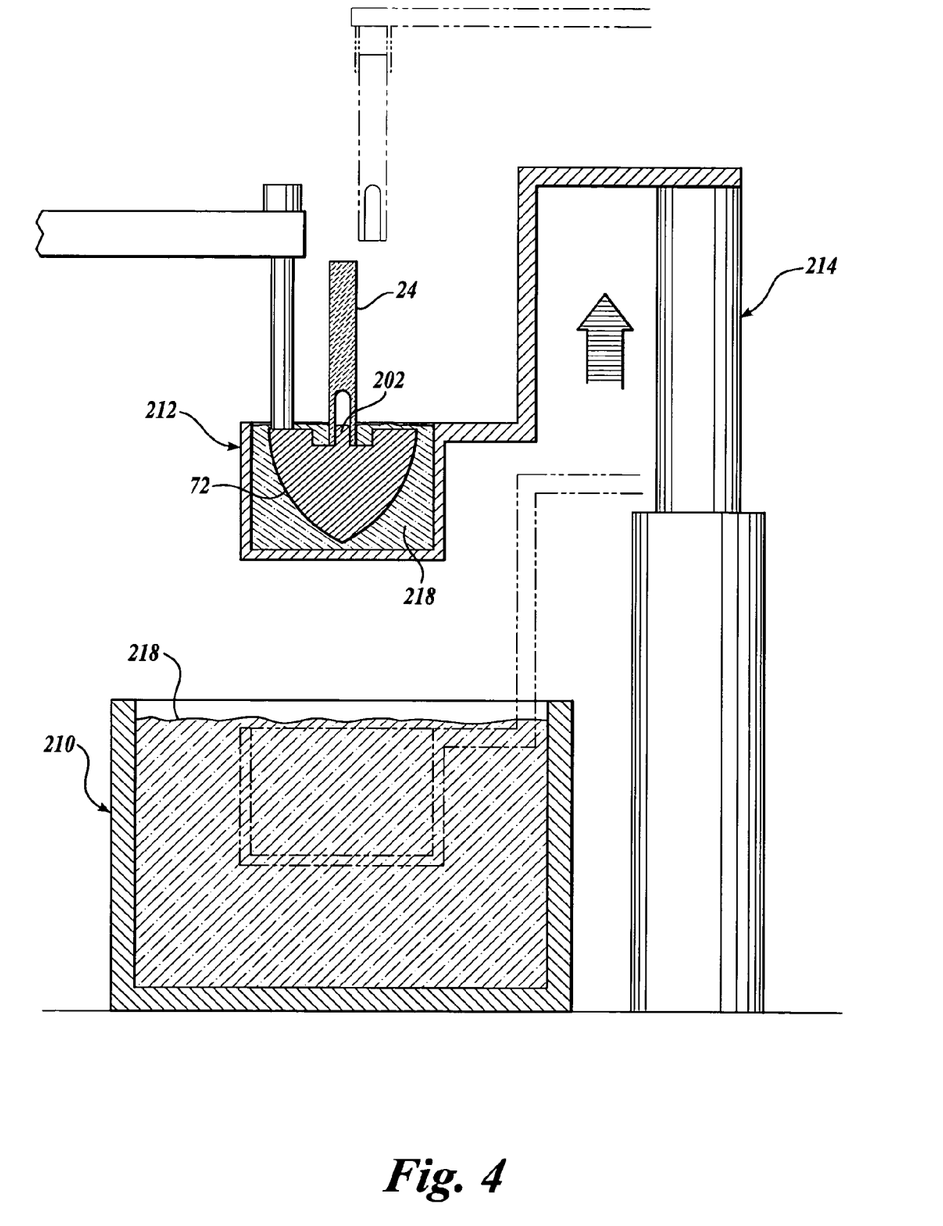
FIG. 4 is a cross-sectional side view of a portion of the material handling system of FIG. 2, showing a receptacle containing a portion of an artificial seed blank submerged within a cup of an end seal formation material.

A material handling system 40 for automatically assembling and transporting seed blanks 20 between a plurality of assembly stations is best seen by referring to FIGS. 2 and 3. The material handling system 40 includes a transport assembly 42, a heater 44, a cooling assembly 46, a media filler assembly 48, a restraint handling assembly 50, and a dipping apparatus 204.

The transport assembly 42 includes a carousel 60 operatively connected to a drive assembly 62 by a spindle shaft 64 extending through a platform 66. The drive assembly 62 is suitably a well-known motor, such as a stepper motor or a well known AC or DC motor. The spindle shaft 64 is suitably a rod extending between the drive assembly 62 and a disc-shaped holder plate 68. The spindle shaft 64 is coupled to the holder plate 68 by a well known bearing 70.

Disposed around the perimeter of the holder plate 68 is a plurality of receptacles 72, commonly referred to as "pucks." The receptacles 72 suitably hang from the holder plate 68 by a pin 74. Each receptacle 72 also includes a seat 76 having an upwardly extending peg 202 sized to receive a cotyledon restraint 24, as is described in greater detail below. As coupled to the holding plate 68, the receptacles 72 are disposed in a substantially circular configuration. Although a substantially circular configuration of receptacles is preferred, other sequential configurations, such as an oval or substantially linear configuration, are also within the scope of the present invention.

As may be best seen by referring to FIG. 3, the restraint handling assembly 50 will now be described in greater detail. The restraint handling system 50 includes a feeder arm 90 and a grip assembly 204, such as a tweezer or suction cup. The feeder arm 90 is suitably in communication with a reservoir (not shown) containing a plurality of cotyledon restraints 24. The cotyledon restraints 24 are stored within the reservoir, and the feeder arm 90 selectively retrieves a cotyledon restraint 24 from within the reservoir by the grip assembly 204.

After a cotyledon restraint 24 is retrieved from the reservoir, the feeder arm 90 is positioned above a receptacle 72, such that the cotyledon restraint 24 is positioned above the peg 202. The feeder arm 90 is displaced downwardly towards the receptacle 72 until the peg 202 is centrally received within the cotyledon restraint opening 32. As received on the receptacle 72, the peg 202 assists in stabilizing the cotyledon restraint 24 on the receptacle 72, and substantially seals the cotyledon restraint opening 32 due to the peg 202 being sealingly received within the cotyledon restraint opening 32. Thereafter, the grip assembly 204 releases the cotyledon restraint 24 on the receptacle 72 and the receptacle 72 is displaced into a position proximate the dipping apparatus 204 by the transport assembly 42.

The dipping apparatus 204 includes a container 210 of an end seal formation material 218, such as wax, and a dipping cup 212 connected to a dipping arm mechanism 214. The container 210 is suitably a tub-like structure filled with the end seal formation material 218 and is suitably heated by a heating apparatus (not shown) to keep the end seal formation material 218 in a substantially liquid state.

The dipping arm mechanism 214 is suitably a pneumatically or hydraulically actuated mechanism and is operable to reciprocate the dipping cup 212 between the container 210 and a pre-positioned receptacle 72 in a direction substantially indicated by the arrow 216. As is described in greater detail below, the dipping apparatus 204 is used to create the primary end seal 200.

Still referring to FIG. 3, the seed shell handling assembly 43 includes an arm 110 having a tweezer assembly 112 operatively connected to one end of the arm 110. The tweezer assembly 112 is suitably a controllable pickup device adapted to selectively retrieve seed shells 22 from a reservoir (not shown). The seed shell handling assembly 43 coaxially positions a seed shell 22 above the cotyledon restraint 24. As positioned, the arm 110 selectively displaces the seed shell 22 downwardly, such that the cotyledon restraint 24 is received within the seed shell 22. The tweezer assembly 112 then releases the seed shell 22, and the arm 110 raises upwardly and away from the now-joined cotyledon restraint 24 and seed shell 22.

Although it is preferred that the feed arm 90 and the arm 110 actuate downwardly, it should be apparent that other methods, such as displacing the transport assembly 42 upwardly to place the cotyledon restraint 24 into contact with the seed shell 22 or with the receptacle 72, are also within the scope of the present invention. It should also be apparent that although a material handling system 40 having both a restraint handling assembly 50 and a seed shell handling assembly 43 is preferred, they are optional to the operation of such a system. As a nonlimiting example, only one arm may be used for both the restraint handling assembly 50 and seed shell handling assembly 43. Accordingly, such embodiments are also within the scope of the present invention.

Referring back to FIG. 2, the media filler assembly 48 will now be described in greater detail. The media filler assembly 48 includes a filler arm 120 and a dispensing nozzle 122 in fluid communication with the filler arm 120. The filler arm 120 is operatively connected to a reservoir (not shown) containing liquid gametophyte. The dispensing nozzle 122 is suitably located above a bore 170 extending through a portion of the cooling assembly 46. Although the present embodiment describes the dispensing nozzle 122 as located proximate to a bore extending through the cooling assembly, other embodiments, such as locating the dispensing nozzle before the cooling assembly, are also within the scope of the present invention.

When a seed shell 22 is located beneath the dispensing nozzle 122, the media filler assembly 48 selectively dispenses a predetermined amount of gametophyte 26 into the open end of the seed shell 22. The exact amount of gametophyte dispensed into the seed shell 22 varies according to the volume of the seed shell 22. In one preferred embodiment, the seed shell 22, including the cotyledon restraint 24, is filled with gametophyte 26 to a predetermined volume that is less than the total available volume after the cotyledon restraint 24 is disposed within the seed shell 22.

As a non-limiting example, the predetermined volume of gametophyte 26 disposed within the seed shell 22 is about 10 $mm^3$ to 50 $mm^3$ less than the total available volume of the seed shell 22 containing the cotyledon restraint 24. The exact volume is determined to permit attachment of the dead end seal (not shown) to the resulting seed blank 20. Accordingly, the predetermined amount of gametophyte is a direct function of the size and shape of a seed shell 22 and, in certain embodiments, is less than the total volume available. After the predetermined amount of gametophyte is dispensed into the seed shell 22 at this assembly station, the material handling system 40 selectively transports the seed shell 22 to the cooling assembly 46.

The cooling assembly 46 is a well-known chiller and only portions are shown for ease of description. The cooling assembly 46 includes a chiller box 130 substantially encasing a plurality of receptacles 72 to accelerate a state change of gametophyte 26 within the seed shells 22. Specifically, the cooling assembly 46 accelerates the rate by which the gametophyte 26 changes state from a substantially liquid state to a gelatin-like state. Also, the cooling assembly 46 may assist in bonding the cotyledon restraint 24 within the seed shell 22 for those embodiments where the cotyledon restraint 24 and seed shell 22 are coupled together as part of the seed blank 20 manufacturing process.

Before the gametophyte 26 is deposited within the seed shell 22, the seed shell 22 is passed through a portion of the cooling assembly 46, thereby accelerating the rate at which the seed shell 22 and cotyledon restraint 24 are bonded. Although it is preferred that the cooling assembly 46 pre-cool the combination seed shell and cotyledon restraint, other embodiments, such as permitting the seed shell and cotyledon restraint bond under ambient conditions, are also within the scope of the present invention. After completion of the cooling stage, the combination of the seed shell 22, cotyledon restraint 24, and gametophyte 26 is commonly referred to as a "seed blank."

Although a plurality of receptacles 72 are illustrated as being disposed within the cooling assembly 46, other embodiments, such as only one receptacle 72 within the chiller box 130, are also within the scope of the present invention. Also, the cooling assembly 46 is an optional component of the material handling system 40 and, therefore, other embodiments, such as material handling systems that do not include a cooling assembly, are also within the scope of the present invention.

After the cooling cycle has been completed, the drive assembly 62 selectively actuates the transport assembly 42 to a discharge station 140. At the discharge station 140, the seed blank 20 is removed from the receptacle 72 and into a holding bin 142 by an arm 144 coupled to a constant, low rpm motor by an adjustable clutch so that the amount of pressure exerted on the seed blank is constant and limited. The receptacles 72 are suitably heated by passing through a heating chamber 400 during the time that the torque from the arm 144 is applied so that the seed blank 20 is released when the wax bond between the receptacle 72 and seed blank 20 is minimized.

Specifically, the arm 144 rotates in a direction indicated by the arrow 146, thereby knocking the seed blank 20 off of the receptacle 72 and into the holding bin 142. Thereafter, the seed blanks are transported to another location where an embryo is inserted within the cotyledon restraint 24 and an end seal (not shown) is applied to the open end of the seed blanks 20 to seal the embryo within the seed blank 20.

Still referring to FIG. 2, the heater 44 will now be described in greater detail. In that regard, a collar 150 housing a heating coil or a warm air blower assembly (not shown) substantially encases a plurality of receptacles 72. As housed within the collar 150, heat is either radiated or blown onto the receptacles 72 to keep the end seal formation material from being cooled by the cooler temperature of the receptacle 72 which helps the end seal formation material to bond to the seed shell 22 and form a better end seal 200.

Although a plurality of receptacles 72 are illustrated as being disposed within the collar 150, it should be apparent that other embodiments, such as a collar housing only a single receptacle, are also within the scope of the present invention. Also, it should be apparent that a heater is an option to the material handling system 40 of the present invention and, therefore, other embodiments, such as a material handling system without a heater, are also within the scope of the present invention.

A summary of the method of the present embodiment is best understood by referring to FIGS. 2-7. In that regard, at least one receptacle 72 is preheated by the heater 44 to a desired temperature. After the desired temperature is achieved, the drive assembly 62 selectively rotates the transport assembly 42 in a direction indicated by the arrow 152, into another assembly station to receive a cotyledon restraint 24 from the restraint handling assembly 50.

At this assembly station, the cotyledon restraint 24 is selectively displaced onto the seat 76 and peg 200 by the feed arm 90. Thereafter, the receptacle 72 containing the cotyledon restraint 24 is transported to another assembly station where the cotyledon restraint 24 is immersed into the end seal formation material 218 to form the primary end seal 200.

As may be best seen by referring to FIGS. 4-7, the formation of the primary end seal 200 will now be described in greater detail. In that regard, the dipping cup 212 is either displaced into or is removed from the container 210 containing a volume of the end seal formation material 218. This position is illustrated in phantom in FIG. 4. The dipping arm mechanism 214 displaces the dipping cup 212 upwardly until it immerses the receptacle 72 within the volume of end seal formation material 218 disposed within the dipping cup 212. Because the peg 202 is sealingly received within the cotyledon restraint opening 32 of the cotyledon restraint 24, end seal formation material 218 is substantially prevented from seeping into the cotyledon restraint opening 32. As a result, the cotyledon restraint opening 32 remains unobstructed.

Figure 5:
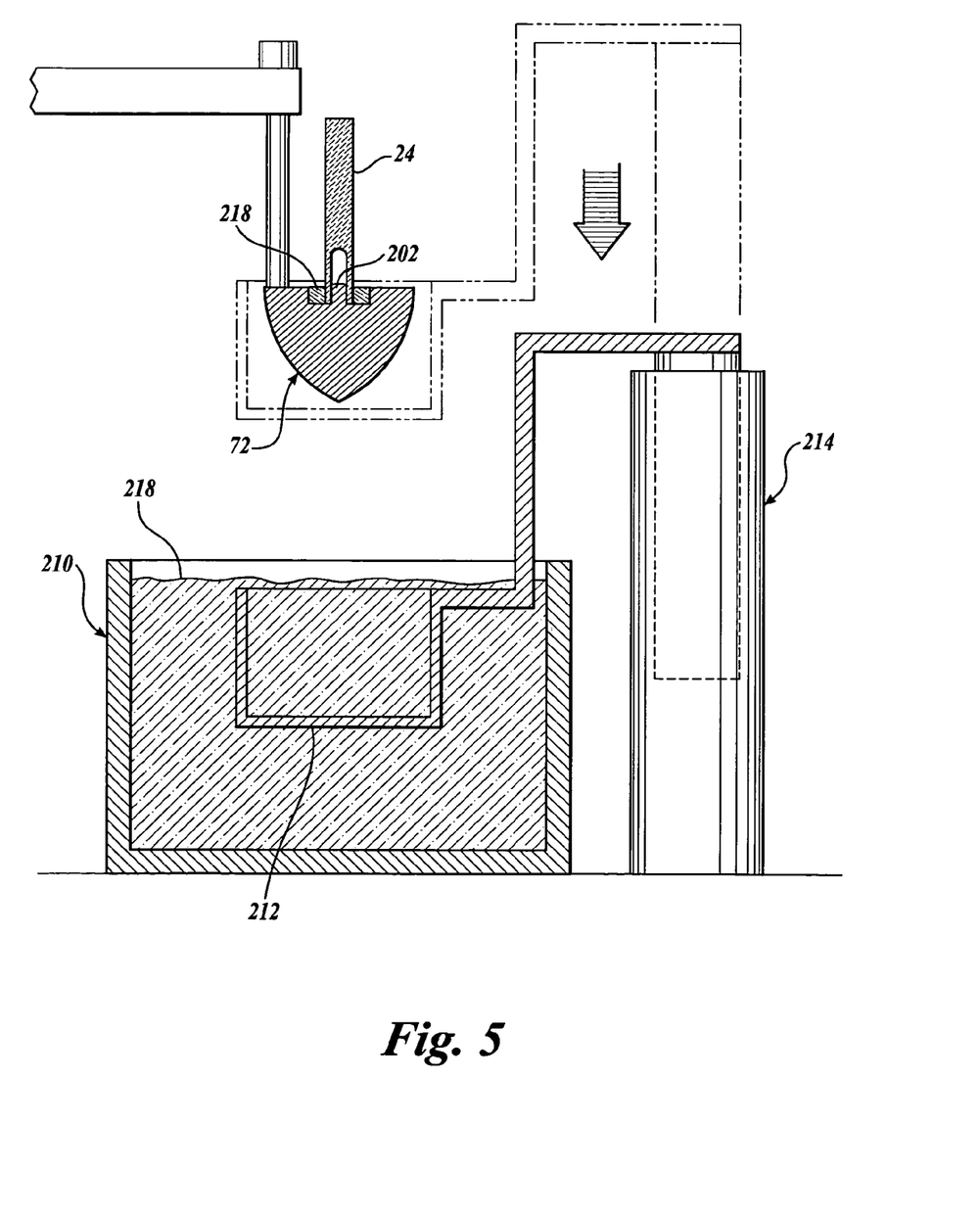
FIG. 5 is a cross-sectional side view of the portion of the material handling system of FIG. 4, showing the receptacle after being submerged within a cup of an end seal formation material.
Figure 6:
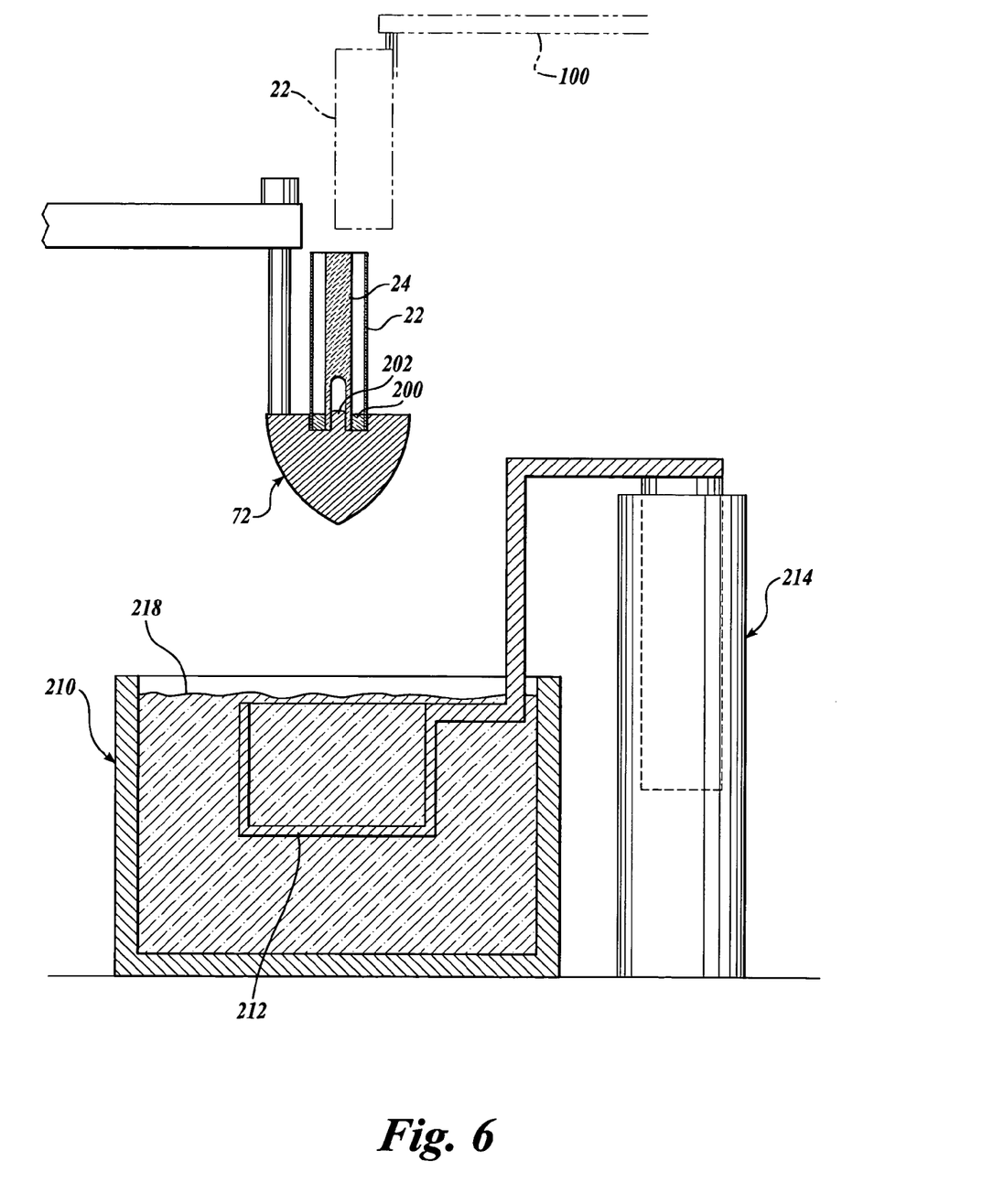
FIG. 6 is a cross-sectional side view of the portion of the material handling system of FIG. 4, showing the receptacle after placement of a seed shell onto the receptacle.

As is best seen by referring to FIG. 5, the dipping cup 212 is returned to the container 210 by the dipping arm mechanism 214, leaving a predetermined volume of end seal formation material 218 within the seat 76 of the receptacle 72. Thereafter, the arm 100 positions a seed shell 22 coaxially above the cotyledon restraint 24 and lower the seed shell 22 until it is seeded within the seat 76. As seated within the seat 76, a primary end seal 200 of a depth substantially equal to the depth of the seat 76 is formed at one end of the seed shell 22. The transport assembly 42 is then actuated to the next assembly station, and the end seal formation material 218, forming the primary end seal 200, is permitted to change state; e.g. harden and, thereby, attach itself to the sidewalls of the cotyledon restraint 24 in seed shell 22.

Figure 7:
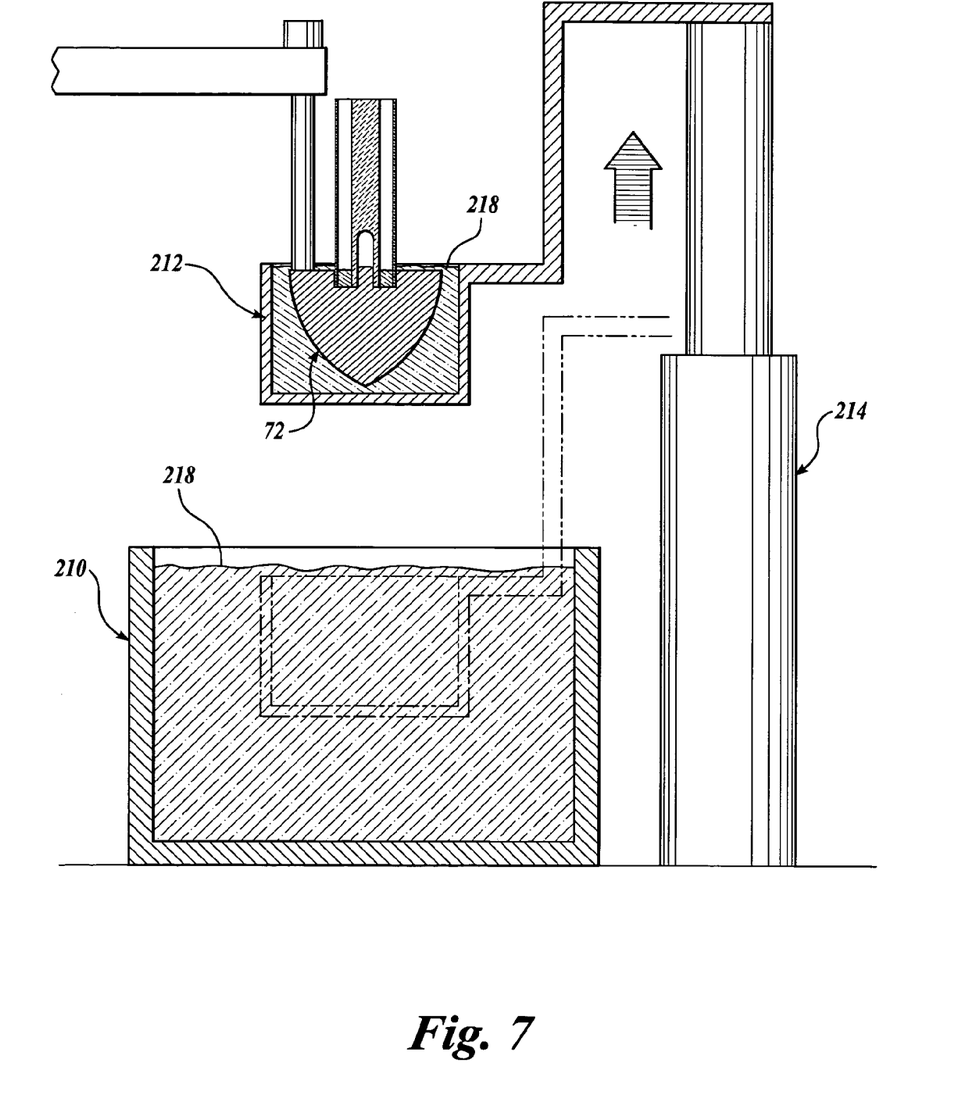
FIG. 7 is a cross-sectional side view of the portion of the material handling system of FIG. 6 showing an alternate embodiment of a process for manufacturing an artificial seed where the artificial seed blank is resubmerged into the cup of an end seal formation material.

As an option, and as may be best seen by referring to FIG. 7, instead of actuating the transport assembly 42 to another assembly station, the receptacle 72 containing the seed coat 22 having the primary end seal 200 formed therein, may be re-dipped a second time into the dipping cup 212. In this embodiment, dipping cup 212 containing the end seal formation material 218 submerges the receptacle 72 containing the seed coat 22 in the end seal formation material 218 to form a bond between the seed shell 22 and primary end seal 200.

After the seed shell 22 is placed onto the receptacle 72 and over the cotyledon restraint 24, the transport assembly 42 is again actuated to yet another assembly station, where gametophyte 26 is displaced into the open end of the seed shell 22 by the media filler assembly 48. Once again, the drive assembly 62 actuates the transport assembly 42 to move the receptacle 72 into the cooling assembly 46, where the state change of gametophyte 26 disposed within the seed shell 22 is accelerated by the reduced temperature within the chiller box 130.

The transport assembly 42 continues to rotate about the spindle shaft 64, thereby rotating the receptacle 72 into the discharge station 140, where the seed blank 20 is deposited into the holding bin 142 by the arm 144. Although the method and system of the present invention has only been described with respect to a single seed shell 22 being disposed on a single receptacle 72, it should be apparent that other embodiments are also within the scope of the present invention. As a nonlimiting example, as the receptacle 72 is transported between various assembly stations, multiple seed blanks may be in various stages of assembly. Thus, multiple seed shells may be simultaneously assembled utilizing the material handling system and method of the present invention.

From the foregoing description, it can be seen that the method and system of manufacturing artificial seed coats formed in accordance with the embodiments of the present invention incorporate many novel features and offers significant advantages over currently available systems. While the presently preferred embodiments of the invention have been illustrated and described, it is to be understood that, within the scope of the appended claims, various changes can be made therein without departing from the spirit of the invention.

As a nonlimiting example, various assembly stations may be combined at a single location. Specifically, the seed shell handling assembly and media filler assembly may be accomplished at a single location. In that regard, after the seed shell handling assembly 43 displaces a seed shell 22 onto a cotyledon restraint 24, the media filler assembly 48 may be displaced into proximity to the open end of the seed shell 22 to dispense media into the seed shell 22 at the same location where the seed shell handling assembly 43 placed the seed shell 22 onto the cotyledon restraint 24. Accordingly, such embodiments are also within the scope of the present invention.

The invention claimed is:

1. A method of manufacturing an artificial seed blank, comprising:
   (a) providing a material handling system having means for automatically assembling and transporting an artificial seed blank between a plurality of assembly stations arranged in a sequential configuration, wherein the means for automatically assembling and transporting an artificial seed blank between the plurality of assembly stations includes a plurality of receptacles;
   (b) placing a seed shell on one of the plurality of receptacles containing an end seal formation material at a first assembly station;
   (c) forming an end seal at one end of the seed shell by permitting a predetermined amount of the end seal formation material to change state; thereafter
   (d) depositing media into the seed shell;
   (e) positioning the seed shell at a second assembly station;
   (f) removing the seed shell from the receptacle at the second assembly station; and
   (g) placing a restraint on the one of the plurality of receptacles before placing a seed shell on the same one of the plurality of receptacles, wherein the end seal formation material is deposited within one of the plurality of receptacles by dipping the one of the plurality of receptacles in a container of end seal formation material after placing a restraint on the one of the plurality of receptacles.

2. The method of manufacturing an artificial seed blank of claim 1, wherein the end seal formation material is a wax.

3. The method of manufacturing an artificial seed blank of claim 1 further comprising dipping the seed shell in the container of end seal formation material.

4. The method of manufacturing an artificial seed blank of claim 1, wherein dipping the one of the plurality of receptacles in a container of end seal formation material includes filling a cavity of the one of the plurality of receptacles with a predetermined amount of the end seal formation material.

5. The method of manufacturing an artificial seed blank of claim 4, wherein the end seal formation material is a wax.

6. The method of manufacturing an artificial seed blank of claim 4, further comprising dipping one of a plurality of receptacles in the container of end seal formation material.

7. The method of manufacturing an artificial seed blank of claim 1, further comprising heating a predetermined number of the plurality of receptacles before placing a seed shell on one of the plurality of receptacles.

8. The method of manufacturing an artificial seed blank of claim 6, further comprising cooling the seed shell after depositing media into the seed shell.

9. The method of manufacturing an artificial seed blank of claim 1, wherein the end seal is a primary end seal.

* * * * *